No. 752,938. PATENTED FEB. 23, 1904.
J. WEHINGER.
MACHINE FOR MAKING WOOD MOSAIC FLOORING OF BLOCKS OF WOOD.
APPLICATION FILED NOV. 19, 1901.
NO MODEL. 5 SHEETS—SHEET 1.

Witnesses:

Inventor:
Johann Wehinger.

Fig. 2. (A-B)

No. 752,938. PATENTED FEB. 23, 1904.
J. WEHINGER.
MACHINE FOR MAKING WOOD MOSAIC FLOORING OF BLOCKS OF WOOD.
APPLICATION FILED NOV. 19, 1901.
NO MODEL. 5 SHEETS—SHEET 3.
*Fig. 3.*
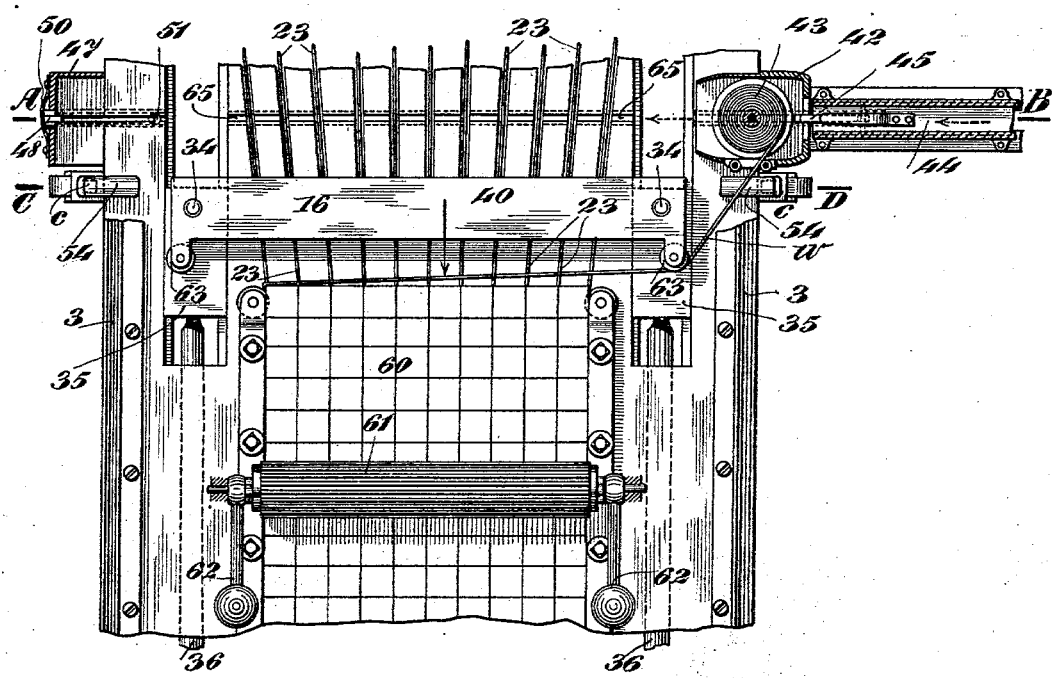
*Fig. 4 (C-D)*
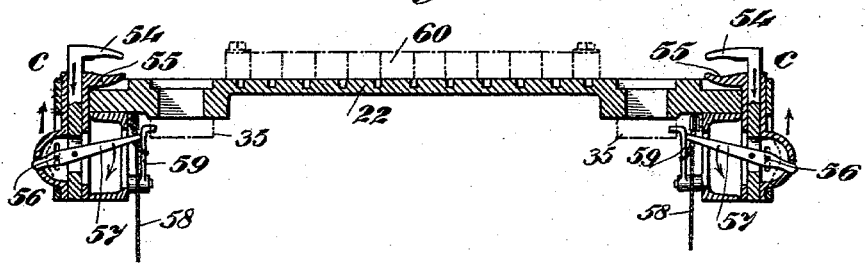
Witnesses:
Inventor:
Johann Wehinger.

No. 752,938. PATENTED FEB. 23, 1904.
J. WEHINGER.
MACHINE FOR MAKING WOOD MOSAIC FLOORING OF BLOCKS OF WOOD.
APPLICATION FILED NOV. 19, 1901.
NO MODEL. 5 SHEETS—SHEET 4.
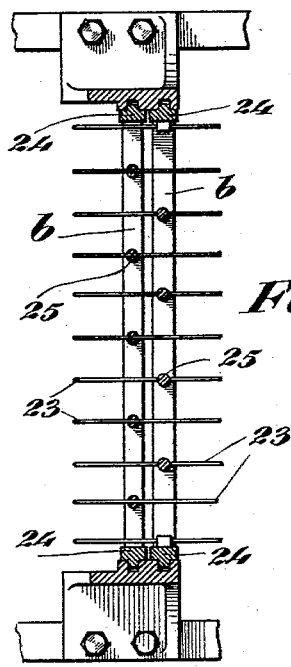
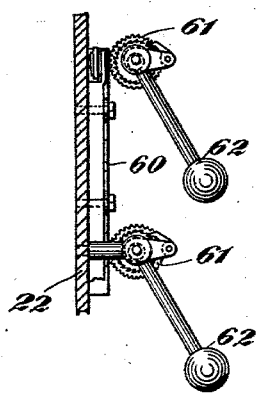
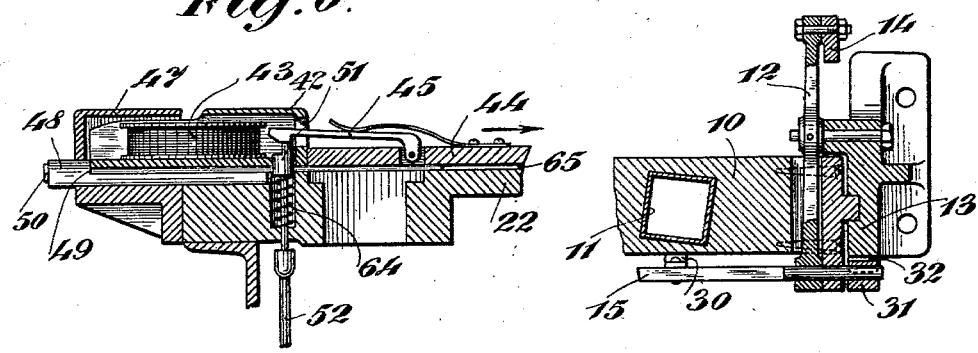
Witnesses
Inventor:
Johann Wehinger No. 752,938. Patented February 23, 1904.

UNITED STATES PATENT OFFICE.

JOHANN WEHINGER, OF DORNBIRN, AUSTRIA-HUNGARY, ASSIGNOR TO FABRIK FÜR MECHANISCHE HIRNHOLZMOSAIK, GESELLSCHAFT MIT BESCHRÄNKTER HAFTUNG, OF MUNICH, GERMANY, A FIRM.

MACHINE FOR MAKING WOOD MOSAIC FLOORING OF BLOCKS OF WOOD.

SPECIFICATION forming part of Letters Patent No. 752,938, dated February 23, 1904.

Application filed November 19, 1901. Serial No. 82,916. (No model.)

*To all whom it may concern:*

Be it known that I, JOHANN WEHINGER, a citizen of the Empire of Austria-Hungary, and a resident of Dornbirn, Austria-Hungary, have invented new and useful Improvements in Machines for Making Wood Mosaic Flooring of Blocks of Wood, of which the following is a specification.

The present invention relates to improvements in a machine for making wood mosaic flooring of blocks of wood which are linked together by means of wires interwoven like a textile fabric. These improvements partly relate to the feeding apparatus, partly to the heddles, and partly to the method of operating the shuttle.

The feeding apparatus consists of a plurality of channeled rows which are moved forward by degrees in such a manner that the undermost blocks of each channeled row of the machine are delivered successively. The sets of channeled rows move back with a jerk. The heddles, contrary to the already-known construction, are borne and moved direct by eccentrics or the like below them and are guided vertically to the sides. The shuttle is loosely connected with a sliding piece by means of which it is moved from one side of the machine to the other, where it is released from its operating-piece, which then returns alone into its original position with the next weft. The piece is again moved toward the shuttle and connected therewith, taking the shuttle back with it in its return movement.

One form of construction of the invention is illustrated by way of example in the accompanying drawings.

Figure 1:
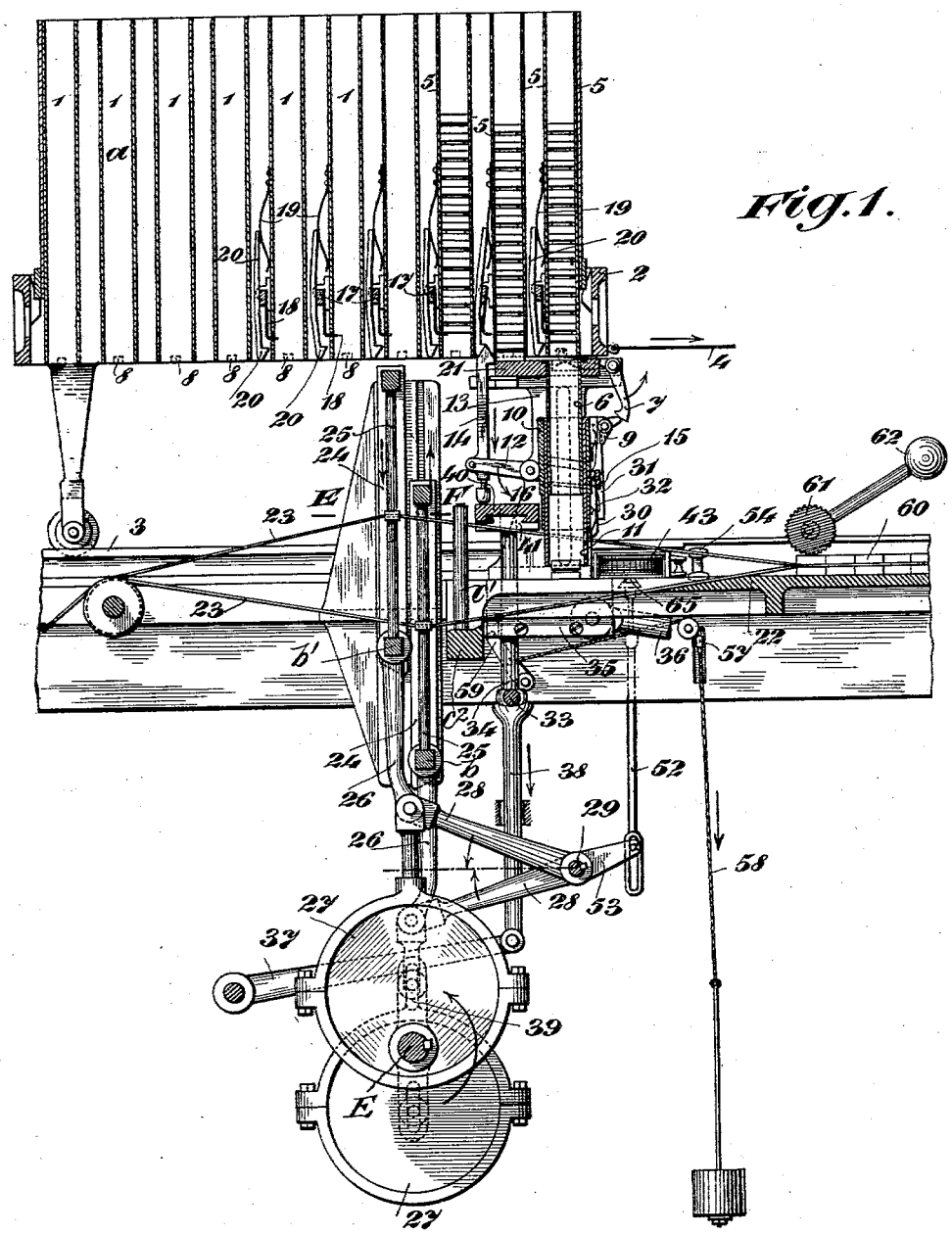
Figure 2:
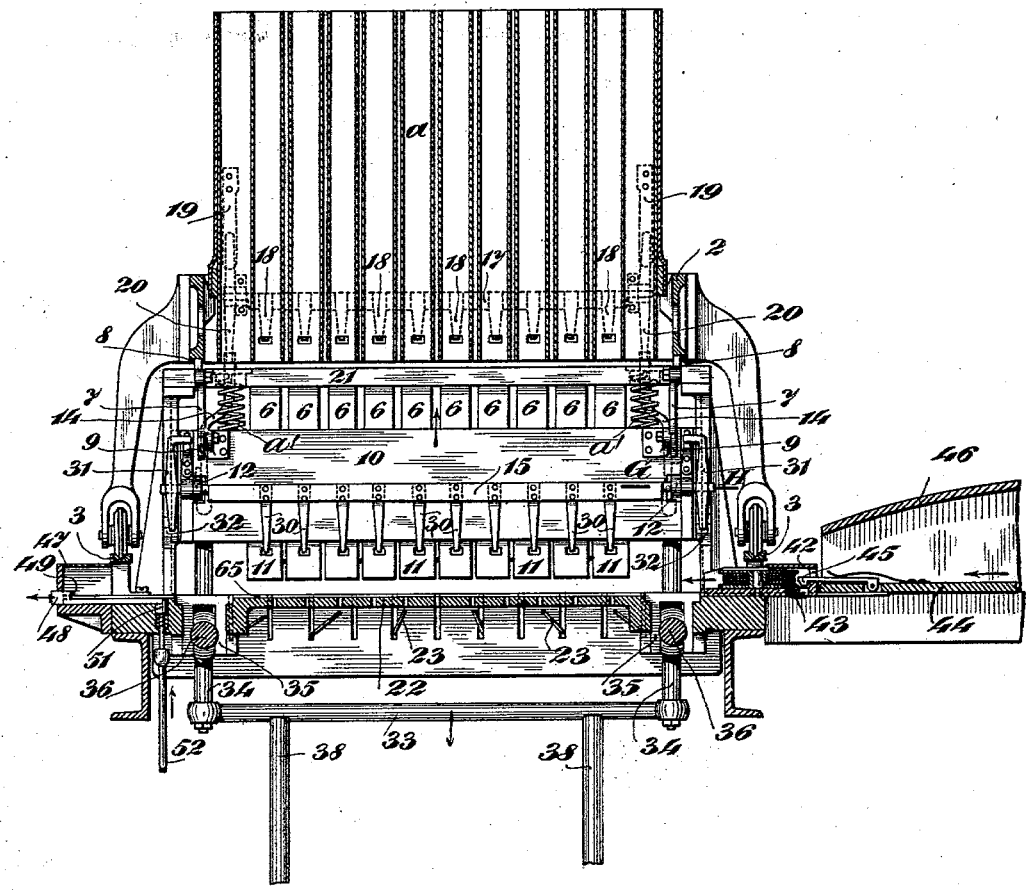
Figure 9:
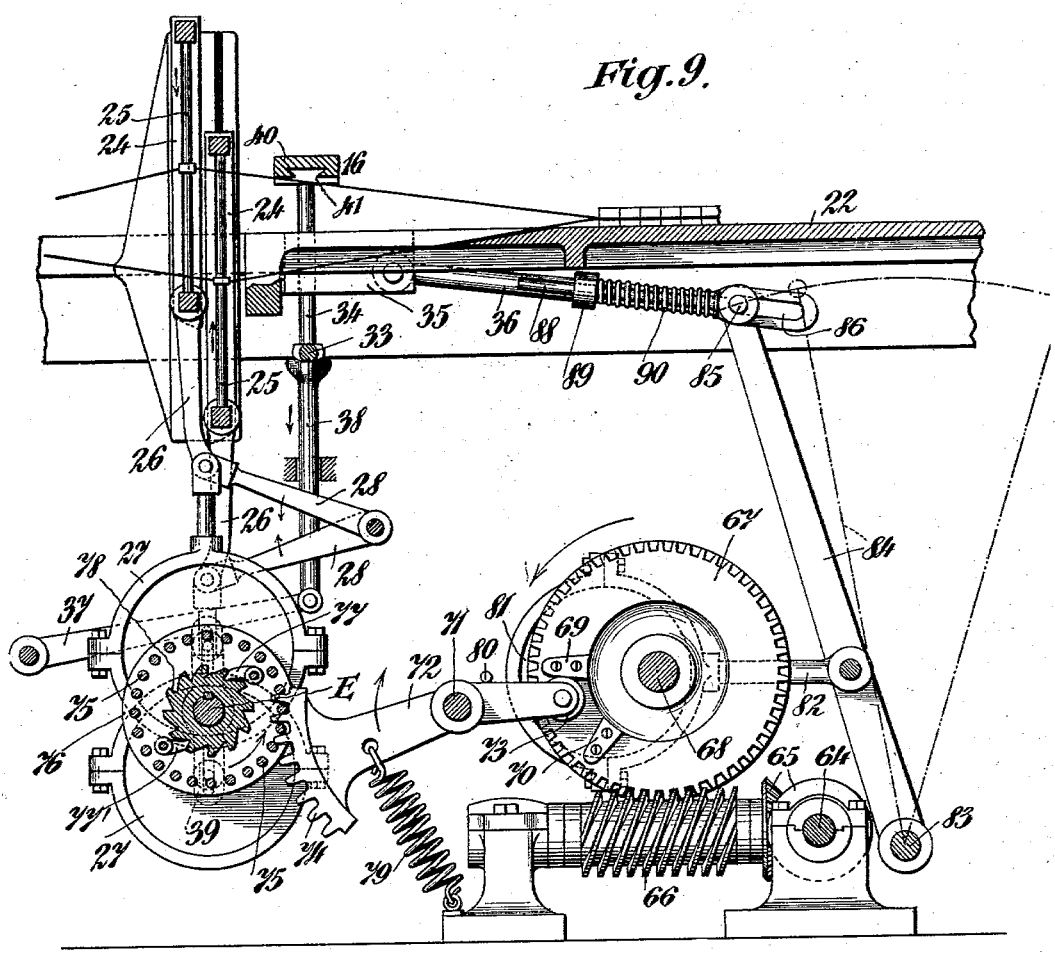
Figure 10:
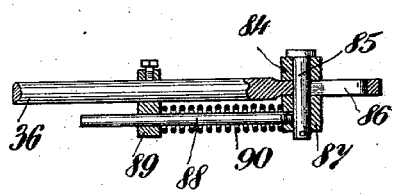

Figure 1 is a vertical section of a part of the machine. Fig. 2 is a section on the line A B of Fig. 3. Fig. 3 is a partially top view of the machine. Fig. 4 is a partially-sectional view on the line C D. Fig. 5 is a partially-sectional view on the line E F of Fig. 1. Fig. 6 is a section, on an enlarged scale, of a stop device for the shuttle. Fig. 7 shows a device for pressing the completed piece of wood mosaic. Fig. 8 is a partially-sectional view, on an enlarged scale, on the line G H of Fig. 2. Fig. 9 is a fragmentary longitudinal vertical section of the machine, illustrating the mechanism for opening and closing the shed and for imparting to the lay its longitudinal to-and-fro movements over the work table or board; and Fig. 10 is a sectional detail view.

*a* is the feeding apparatus of the machine. This feeding apparatus consists of a plurality of channeled rows 1, each row containing as many channels as there are wood blocks in the width of the wood mosaic plaque. The channels are formed by cross-partitions between each two longitudinal walls 5, Fig. 1, and are filled with superposed wood blocks. These channeled rows 1 are supported by a carriage 2, which travels on the rails 3. On the carriage engages one end of a draw-bar 4, which is loaded with weights and effects the forward movement of the carriage. This forward movement takes place step by step, so that the lower ends of each vertical channeled row 1 come successively above a row of channels 6 (which is fixed in the frame of the machine) and in such a manner that the channels of the feeding apparatus come vertically exactly above the channels 6. The carriage 2 is stopped after each forward movement by pawls 7, which engage in notches 8 on the longitudinal sides of the carriage and can be released by plates 9. These plates 9 are pivoted to a supporting-beam 10 through which channels 11 are passed, which engage telescopically with the lower ends of the channels 6. The beam 10, with the channels 11, is movable vertically, and the angular pawls 7 project with one arm in the track of the plates 9, so that during the upward movement of the supporting-beam 10 the pawls are pushed to one side, whereby they come out of engagement with the notches 8, while during the downward movement of the beam 10 the plates 9 can escape the pawls 7. The levers 12, which are placed in standards 13, Fig. 8, of the frame of the machine and which are linked on the one hand to slides 14 and on the other hand to a bar 15, placed at the back of the beam 10, serve to move the latter downward. The lower ends of the slides 14 rest on the lay 16, so that during the upward movement thereof the levers 12 are caused to turn, whereby the beam 10, with the channels 11, which it supports, is moved downward. The beam is, moreover, controlled by springs $a'$, which effect its upward motion when the lay moves down. In its upward and downward movements the supporting-beam 10 is guided by means of a groove and tongue in the lateral standards 13, Fig. 8.

In the space between each two channeled rows 1 is a pivotally-arranged bar 17, which has a hook 18 for each channel. The hooks 18 can project through slits in the partitions 5 into the interior of the channels. The ends of the bars 17 each bear an arm 20, one end of which is controlled by a spring 19, by means of which the hooks 18 are pressed into the interior of the channels. The other end of the arm 20 has a sloping surface against which the head of the slide 14 can act, whereby the bar is caused to turn and the hooks 18 are withdrawn. The channels 6 are fixed in a transverse plate 21, over which the lower ends of the channeled rows 1 slide when the carriage 2 is moved. The arrangement is such that when a channeled row lies vertically above the channels 6 the last row but one has already passed over the plate 21 and the space lies vertically over the slides 14 between the last row but one and its proceeding row, so that when these slides move down they can act on the arm 20, whereby the hooks 18 are withdrawn. These hooks 18 usually engage under the last block or in the groove of the last block in each channel, and thus hold back the superposed blocks of each channel. By pushing back these hooks the blocks are consequently released and are able to fall down until the undermost rests on the plate 21. When the carriage moves on the next step, this last row but one passes above the channels 6, so that the lowest wood block of each channel can fall into the channels 6 and from thence into the channels 11, (which at this moment are in their highest position,) where they are held until the next downward movement of the beam 10. The other blocks in the channels 1 are stopped by the hooks 18 engaging in the groove of the lowermost block in each channel. The device for keeping the blocks in the channels 11 consists of hooks 30, which can project through slits in the walls of the channels 11 into the interior thereof, like the hooks 18. The ends of the bar 15 are each provided with a double arm 31, which, controlled by springs, effect the pressing in of the hooks 30 inside the channels 11. With the downward movement of the beam 10 these arms 31 come in contact with the projections 32 on the standards 13, whereby the bar 15 is turned and the hooks are withdrawn. The wood blocks held back by these hooks are then free and can fall down onto the work-board. These operations are described with reference to Fig. 1. The feeding apparatus therefore acts so that during its step-by-step forward motion the lower ends of the channeled rows 1 pass in succession over the channels 6, and the lowest block is always delivered by the channels 1. When the last channeled row has passed over to the channels 6, the carriage is brought back into its original position in order to be moved forward again step by step.

Heddles $b$ serve to open and close the shed. These heddles each consist of a frame 24, which is guided vertically by means of groove and tongue, Fig. 5, and provided with vertical bars 25 (placed between the top and bottom of the frame) for guiding the warp-wires. The warp-wires 23 pass through holes in these bars and are properly spaced and guided by rollers $c'$, stuck on pins secured to a cross-beam $c^3$, Fig. 1. These heddles are not suspended on moving pieces, as usual in looms, but are connected each by a link 26 to an eccentric 27. The heddles are consequently borne by these eccentrics and operated by them direct. The end of a lever 28 engages with bolts effecting the connection of each link with the axle of the eccentrics. These levers 28 are set on an axle 29 and serve to guide the link-bolts. The axle of the eccentrics 27 is moved intermittently and in such a manner that the shed is quickly opened and quickly closed and that after each opening there is a slight pause in order to enable the shuttle to pass through, and after each closing there is a longer pause during which the lay 16 is moved on the work-table. This lay is supported by vertically-guided bars 34, connected with each other by a cross-bar 33. The bars 34 pass through slides 35, Figs. 1 and 3, movable in the work-table. With each of these slides engages a link 36, the motion of which effects the forward and backward movement of the lay. Lever-arms 37 move the lay up and down and are each linked to a vertical bar guided against the cross-bar 33. The motion of the lever-arms 37 is effected by means of a double arm 39 for each, placed on the axle of the eccentrics 27 and provided with rollers at the ends. These rollers act on the lever-arm 37 when the axle of the eccentrics rotates. The lay 16 consists of an upper bar 40 and of plates 41, guided by means of a dovetail on the lower side of the bar 40. The warp-wires 23 are taken up between these plates.

The shuttle consists of a sleeve 42, Figs. 2, 3, and 6, in which a spool of wire 43 is placed to revolve on a vertical axis. In Figs. 2 and 3 the shuttle is shown on the right side of the machine connected with a slide 44. The connection between the slide 44 and the shuttle is effected by means of a catch 45, which is pivotally arranged on the slide and passes through an opening in the casing of the sleeve 42. The slide 44 can move in a guide 46 and is connected with the picker, so that it can be driven, by means of the latter, with the shuttle, to the left side of the machine. On that side of the machine the slide and shuttle are disconnected, and the former returns, with the picker, to the right side of the machine, leaving the shuttle behind on the left side. There is a box 47 provided on the left side of the machine for receiving the shuttle, in the bottom of which box is guided, by means of a dovetail, a plate 48. This plate has on its outer end a raised piece 49, against which the shuttle strikes when the latter is moved from the right side to the left side of the machine, so that the plate 48 participates in the latter part of the shuttle motion, overcoming the action of the springs 50, which act on the outer end of the plate. Owing to the plate 48 being taken with the shuttle, a bolt 51, which is usually held back by it, is released and is pressed up by means of a spiral spring 64 through an opening in the bottom of the shuttle-box. For the next shuttle motion from the left to the right side of the machine it will be necessary for the slide 44, which is on the right side of the machine, to be moved to the left side and there come into connection with the shuttle, after which it moves back, taking the shuttle with it. First, however, the bolt which retains the shuttle on the left side of the machine after it has raised the catch 45 must be drawn back underneath. For this purpose the bolt is set on the end of a bar 52, which has a slotted connecting-link underneath, Fig. 1. In this slotted link moves the end of a lever-arm 53, which is firmly keyed on the axle 29. It is obvious that by this arrangement the lever-arm 53 toward the end of its downward movement will draw down the bar 52 and with it the bolt 51, thus releasing the shuttle on the left side of the machine. The catch 45 can then engage behind the wall of the shuttle-box, so as again to make the connection between the shuttle and the slide 44. When it moves across the workboard, the slide 44 is guided in a dovetail-groove 65.

I will now describe the mechanisms for opening and closing the shed and for imparting to the lay its horizontal movements over the work-table 22, reference being had to Figs. 9 and 10.

In Fig. 9, 64 indicates the main driving-shaft geared by bevel-gearing 65 to a worm 66 in gear with a worm-wheel 67 on a counter-shaft 68, said worm having on its face two radial tappets 69 and 70 at a suitable distance from each other, and said shaft 68 carries two eccentrics whose straps are connected by connecting-rods 82 to rock-levers 84, one on each side of the work-table 22, said levers being fulcrumed on a spindle 83 for purposes presently explained. On a spindle 71 is loosely mounted a two-armed rock-lever 72, one of whose arms carries a roller 73 in the path of the tappets or abutments 69 and 70 on worm-wheel 67. The other arm of lever 72 terminates in a toothed sector 74 in gear with the pins 75 of a wheel 76, loose on the eccentric-shaft E, to which is secured a ratchet-wheel 78, engaged by an actuating-pawl 77 and a check-pawl 77'. The sector-lever 72 is acted on by a spring 79 to hold its roller-arm normally against an abutment 80 in the path of the tappets 69 70 on worm-wheel 67. The rock-levers 84 are provided at their upper end with a pin 85, that extends through a longitudinal slot in the forward end of the connecting-rods 36, connected to the slides 35, through which the supporting-rods 34 of the lay 16 extend and hereinabove referred to. The pins 85 of levers 84 carry a sleeve 87, to which is secured a rod 88, guided in a sleeve 89, secured to the connecting-rod 36, and said rod carries a coiled spring 90 between the aforesaid sleeves 87 and 89.

The mechanisms are shown in Fig. 9 in the same relative positions as in Fig. 1, the operation being as follows: The worm-wheel 67 rotating in the direction of arrow and the tappet 69 being in contact with lever 72 will tilt the latter, and thereby cause pin-wheel 76 to rotate and therewith the ratchet-wheel 78 and eccentric-shaft E to reciprocally move the heddles and close the shed. During this movement of the heddles the roller on the arm 39 in contact with lever 37 will move out of contact therewith and allow the lay 16 to descend onto the work-table. At the same time the eccentrics 81 on worm-wheel shaft are also rotated in the direction of arrow and move the rock-levers 84 forward, their pins 85 sliding along the slots 86 in the forward end of the connecting-rods 36 until the lay has reached the work-table 22, when said pins 85 will be in the forward ends of their slots 86 and will then draw the connecting-rods 36 and with them the slides 35 and lay 16 forward to cause the lay to beat up the last row of blocks on said table and the weft-wire, whereby the spring 90 between sleeves 87 and 89 is distended. The eccentrics 81 have then completed a half-revolution, and the tappet 69 has moved out of contact with lever 72, which is immediately returned to its normal position by spring 79, thereby rotating pin-wheel 76 in a reverse direction without, however, rotating the ratchet-wheel 78, as the pawls 77 and 77' will then ride idle over the teeth of said ratchet-wheel.

In view of the relative position of the tappets 69 and 70 the shed will remain closed for a considerable length of time, sufficient for the beating up of the weft, when the tappet 70 will act on lever 72 and rotate the eccentric-shaft E to open the shed through the medium of the pin-wheel 76 and ratchet-wheel 77. At the same time eccentric 81 will rock levers 84 rearwardly or toward the shed and act on the springs 90, the resistance of which is sufficient to move the lay rearwardly also and at the same time place the springs gradually under tension until the pins 88 have reached the rear ends of their slots 86, when the lay will be in a position to move upwardly under the action on lever 37 of a roller on the two-armed lever 39 on eccentric-shaft E. Inasmuch as the distance between the tappets 69 and 70 is comparatively small, the shed will be held open only for a sufficient length of time to cause the delivery-channels 11 to move downward, feed the carriage a step forward, and trip the locking-levers 18 to release the lowermost blanks in the row of feed-channels 1 on plate 21 in rear of the row of feed-channels then in register with the guide-channels 6.

On each side of the machine, a little in front of the shuttle-race, are clips c, Figs. 3 and 4. The shaft of the upper halves 54 of the clips is inserted in the tubular shaft of the lower halves 55. These shafts are linked to a double lever 57, pivoted on a pin 56 to the frame of the machine, the pivotal points being on both sides of the pin 56, so that during the movement of the levers 57 the clips are opened and closed. For operating the levers 57 each of them is connected with a draw-rope or the like, which is weighted with weights at one end and at the other end engages in an arm 59, Fig. 1. These arms 59 each rest against one of the slides 35 and when the lay moves forward follow under the influence of the weights the movement of the slides 35, while when the lay moves back the slides 35 bring back the arms 59 into their original position by lifting the weights. The double levers 57, connected with the draw-ropes, will swing thereby, thus effecting the opening and shutting of the clips c. On the already finished piece 60 of mosaic flooring rest friction-rollers 61, Fig. 7, which are pressed by weighted levers 62 and eccentrics against the mosaic flooring in order to keep it pressed against the work-board without preventing the forward movement of each row of blocks at each forward movement of the lay. The upper plate 40 of the lay has at each end in front projecting rollers 63. From these rollers with each forward movement of the lay for the purpose of pressing a new row of blocks against the finished piece of wood mosaic comes one or other of the weft-wires, stretching diagonally across the machine from the shuttle to the mosaic plaque. As the weft-wire is firmly fixed in front of the shuttle in the clips c it is tightly stretched by the roller 63 and pressed against the prepared piece of mosaic in order to firmly connect the last row of blocks with the piece already made. With its forward motion the lay pushes a new row of blocks in front of it and adds it to the last row of the already made piece of wood mosaic. This new row of blocks is then connected in the same manner by means of the weft-wire during the next forward motion of the lay.

The method of operation of the machine is as follows: Starting from the position shown in Fig. 1, in which the shed is open, the lay 16 is in its highest position; but the channels 11 are in their lowest position. By turning the axle of the eccentrics 27 in the direction of the arrow one heddle moves down and the other up in order to close the shed. The lay 16 falls to the work-board, and the channels 11 move up in order to free the row of blocks resting on the board. When the channels 11 move upward, the plates 9 come in contact with the pawls 7, so that the feeding apparatus is released in order to move forward one step. Thereby the lower end of the next channeled row 1 passes above the channel 6, and the lowest blocks of this row, which were released by a former motion of the machine, fall through the channels 6 into the channels 11, where they are retained by the hooks 30. The shuttle is at this moment on the left side of the machine. The axle of the eccentrics 27 now remains stationary for a long time, and during this pause the lay is moved forward by the bars 36, takes the row of wood blocks lying on the work-board with it, moves it against the finished piece of mosaic plaque, and at the same time tightens by means of one of the rollers 63 the weft-wire and lays it against the last row of the mosaic plaque in order to join on the last row of wood blocks. The lay then returns to its original position and turns the axle of the eccentrics, whereby the shed is again opened, but in the opposite direction to the previous one. During this rotation of the axle the lay is also raised, thereby causing the lever 12 to turn so that the slides 14 are moved up and the channels 11 moved down. With this downward movement of the channels 11 the hooks 30 are drawn back, so that the wood blocks in the channels 11 can fall onto the work-board. In the upward movement of the slides 14 they come in contact with the arms 20, whereby the hooks 18 of the next channeled row 1 are drawn back in order to release the undermost blocks in these channels. If the shed is opened, the arm 53 has also drawn down the bar 52 in order to release the catch of the shuttle on the left side of the machine. The slide 44 is now moved from the right side of the machine to the left side, where it becomes connected with the shuttle, and with its return movement it brings the latter from the left to the right side of the machine. This shuttle motion takes place during a short pause at the end of the opening of the shed. With the further rotation of the axle of the eccentrics the shed will close and the lay move down. During this downward movement of the lay the same operation of the feeding apparatus takes place as previously described. During the long pause of the axle of the eccentrics which now takes place the lay again moves forward and back on the work-board with the further action described above.

During the next quarter-revolution of the axle of the eccentrics the opening of the shed and the moving up of the lay again takes place with the operation connected therewith in the feeding apparatus. At the end of the opening of the shed the shuttle is brought by means of the slide 44 from the right to the left side of the machine, where the shuttle and slide 44 are disconnected, so that the latter can return and leave the shuttle behind on the left side of the machine. The machine is now in the position from which we started and the action is repeated. The blocks can be of real wood or artificial wood or the like. For the purpose of avoiding repetition they have been described as "wood" blocks throughout the specification.

Having now particularly described and ascertained the nature of my said invention and in what manner the same is to be performed, I declare that what I claim is—

1. The combination with a work-table, means for successively feeding thereto rows of blocks, comprising a progressively-movable carriage, rows of open-ended block-holders thereon, a stop device for each holder preventing the blocks from dropping out, means actuating the stop devices of a row of holders to release the lowermost blocks and engage the next succeeding blocks, and guides movable to and from a row of holders adapted to guide the blocks to the table of weaving appliances operating to unite the blocks of each row and the successive rows of blocks into a web by warp and weft threads.

2. The combination with a work-table and feeding devices adapted to successively feed rows of blocks onto said table, comprising a progressively-movable carriage, a series of rows of open-ended block-holders thereon, a stop device for and engaging the lowermost block in each holder, a bar of a width equal to two rows of holders, a row of guide-channels in and depending from said bar, delivery-channels adapted to move simultaneously up and down on said guide-channels, means for moving the delivery-channels and operating during the upward motion thereof to disengage the stop devices of a row of block-holders from the lowermost blocks therein before such row of holders comes into register with the guide-channels and to release said stop devices during their downward motion, means holding the lowermost blocks fed to the delivery-channels during their upward movement from dropping out, and means for releasing the blocks during the downward motion of said delivery-channels whereby a row of blocks is delivered onto the work-table; of appliances for uniting the blocks of a row and the successive rows of such into a web by warp and weft wires.

3. The combination with a work-table and means successively feeding rows of blocks thereto; of weaving appliances comprising reciprocally-movable heddles, and a traversing shuttle operating to unite the blocks of a row and the successive rows of such into a web by means of a warp and weft thread.

4. The combination with a work-table and means for successively feeding rows of blocks thereto; of weaving appliances comprising warp-heddles, means moving the same to open and close the shed, a weft-shuttle, a carrier detachably connected thereto, means driving the carrier from one side to the other through the open shed, means disconnecting the carrier from the shuttle and driving said carrier back before the closing of the shed, then driving said carrier back to the shuttle, connecting it thereto and returning the same to normal position during the next opening of the shed.

5. The combination with a work-table, means for feeding successive rows of blocks thereto, heddles, mechanism reciprocally moving the same to open and close the shed; a shuttle, and mechanism driving said shuttle to and fro through the open shed; of a vertically and horizontally to-and-fro movable lay, for the purpose set forth.

6. The combination with a work-table, a progressively-movable carriage, rows of open-ended block-holders thereon, a spring-actuated latch for and engaging the lowermost block in each holder, and means for delivering the lowermost block from a row of holders to the work-table; of weaving appliances for weaving the blocks of a row and the successive rows of such into a web, comprising a vertically and horizontally to-and-fro movable lay, and means actuated by its upward movement acting on the aforesaid latches of a row of holders to disengage them from the lowermost block therein and to again release said latches by the downward movement of the lay.

7. The combination with a work-table, feeding appliances comprising a progressively-movable carriage, rows of open-ended block-holders thereon, latches engaging the lowermost block in each holder, means periodically disengaging said latches from the lowermost block and engaging the same with the next succeeding blocks, and locking devices locking the carriage after each progressive motion; of vertically-movable guide-channels adapted to receive the released blocks and guide them to the work-table, means connected thereto and acting on the locking devices to release the carriage, and appliances for weaving the blocks of each row and the successive rows of such into a web.

8. The combination with a work-table, means for feeding successive rows of blocks thereto and appliances for weaving the blocks of a row and the successive rows of such into a web; of gripping devices near each end of the shuttle-race operating to grip the weft-thread and hold it taut during the beating-up of the weft.

9. The combination with a work-table, means for feeding successive rows of blocks thereto, and appliances for weaving the blocks of a row and the successive rows of such into a web; of gripping devices near each end of the shuttle-race operating to grip the weft-thread and hold it taut during the beating-up of the weft, and means acting on said devices to release said weft-thread when the lay moves back.

10. The combination with a work-table, means for feeding successive rows of blocks thereto, and appliances for weaving the blocks of a row and the successive rows of such into a web; of gripping devices near each end of the shuttle-race operating to grip the weft-thread and hold it taut during the beating-up of the weft, and means operated by the lay during its backward movement and operating the gripping devices to release the weft-thread.

11. The combination with a work-table, means for feeding successive rows of blocks thereto, and appliances for weaving the blocks of a row and the successive rows of such into a web; of gripping devices near each end of the shuttle-race comprising gripping-jaws, means closing the same to grip the weft-thread during the beating-up of the weft and for opening said jaws during the return movement of the lay.

12. The combination with a work-table, means for feeding successive rows of blocks thereto, and appliances for weaving the blocks of a row and the successive rows of such into a web; said appliances comprising a lay having a projection at each end carrying a roller adapted to engage the weft-thread.

13. The combination with a work-table, means for successively feeding rows of blocks thereto and weaving appliances for weaving the blocks of each row and the successive rows of such into a web; of a yielding shuttle-receiver at one end of the shuttle-race.

14. The combination with a work-table, means for successively feeding rows of blocks thereto and weaving appliances for weaving the blocks of each row and the successive rows of such into a web; of a shuttle-carrier, a shuttle-driver detachably connected with the shuttle-carrier, a shuttle-receiver at one end of the shuttle-race, and means for disconnecting the driver from and connecting it to the shuttle-carrier, for the purpose set forth.

15. The combination with a work-table, means for successively feeding rows of blocks thereto and weaving appliances for weaving the blocks of each row and the successive rows of blocks into a web; of a shuttle-carrier, a shuttle-driver detachably connected to the shuttle-carrier, a movable shuttle-receiver at one end of the shuttle-race, and mechanism controlled by the movements of the receiver to disconnect and connect the shuttle-driver from and to the shuttle, for the purpose set forth.

16. The combination with a work-table, means for successively feeding rows of blocks thereto, and weaving appliances for weaving the blocks of each row and the successive rows of such into a web; of a shuttle-carrier, a shuttle-driver detachably connected with the shuttle-carrier, a movable shuttle-receiver at one end of the shuttle-race, a buffer-spring for said receiver, and means for disconnecting the driver from and connecting it to the shuttle-carrier, for the purpose set forth.

17. The combination with the heddles, means reciprocally moving the same to open and close the shed, the lay, and means imparting thereto a downward movement and a horizontal movement in one direction during the closure of the shed and a horizontal movement in a reverse direction and an upward movement during the opening of the shed; of mechanism organized to time the closure and opening of the shed to enable the lay to perform its aforesaid movements.

In testimony whereof I have signed my name to this specification in the presence of two subscribing witnesses.

JOHANN WEHINGER.

Witnesses:
GEORG HOFFMANN,
FRANZ WACKMUND.